F. P. MILLER.
CUTTING TOOL.
APPLICATION FILED MAR. 5, 1920.

1,431,829.

Patented Oct. 10, 1922.

INVENTOR
Frank P. Miller
By H. C. Lord
Attorney

Patented Oct. 10, 1922.

1,431,829

UNITED STATES PATENT OFFICE.

FRANK P. MILLER, OF MEADVILLE, PENNSYLVANIA.

CUTTING TOOL.

Application filed March 5, 1920. Serial No. 363,412.

*To all whom it may concern:*

Be it known that I, FRANK P. MILLER, a citizen of the United States, residing at Meadville, in the county of Crawford and State of Pennsylvania, have invented new and useful Improvements in Cutting Tools, of which the following is a specification.

This invention relates to that type of tools commonly used as adjustable reamers or milling cutters and comprises a carrier or head with inserted blades. In some respects this invention is an improvement over the construction shown in my former Patent #1,244,227, dated Oct. 23, 1917.

The invention is illustrated in the accompanying drawings as follows:—

Figure 1:
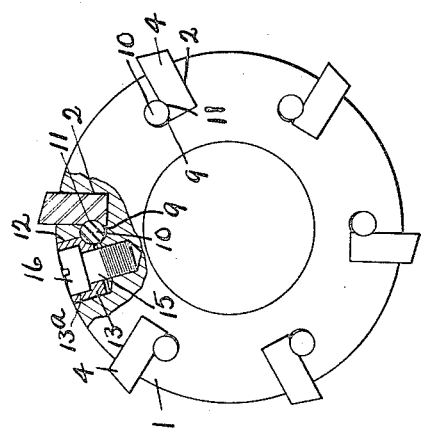

Fig. 1 shows an end elevation partly in section.

Figure 2:
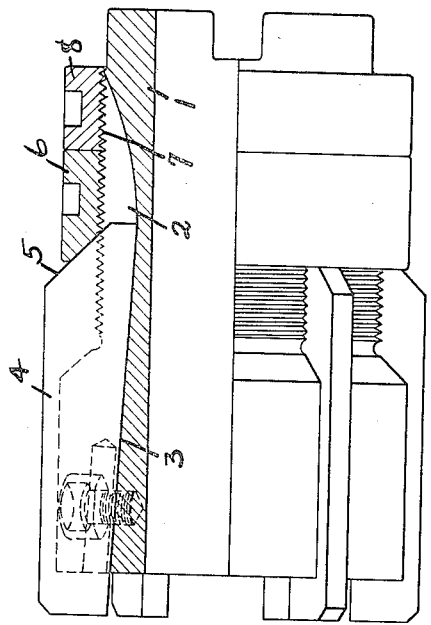

Fig. 2 a side elevation partly in section.

Figures 3, 4:
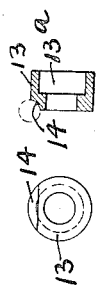

Fig. 3 a bottom view of the wedge plug.

Fig. 4 a central section through the wedge plug.

1 marks the carrier. This is provided with the longitudinal grooves 2, the grooves having the inclined bottoms 3. Cutting blades 4 are arranged in the grooves, the bottoms conforming to the bottoms 3 so that an endwise movement of the blades adjusts them radially. The blades have the tapered ends 5 which are engaged by the tapered ends of the screw-threaded rings 6. The screw-threaded ring 6 operates on the screw threads 7 on the carrier 1 and is locked in adjustment by a lock nut 8.

Fillet openings 9 extend along the side of the grooves 2, the fillet openings extending through the walls of the grooves. Fillets 10 are arranged in these openings and extend into grooves 11 in the sides of the blades 4.

Cylindrically shaped wedge plug openings 12 open into the fillet openings 9 and the cylindrically-shaped wedge plugs 13 are arranged in the openings 12 and have the wedge surfaces 14 which engage the fillets 10. The wedge plugs have the screw head sockets 13ª and screws 15 extend through the plugs 13, the heads 16 of the screws being seated in the sockets 13ª. It will be noted that the fillet opening 9 is slightly larger than the fillet 10 so that there is not only a side wedging action against the blades but also a downward action forcing the bottom of the blade into contact with the bottom of the groove. This construction is very simple and all the openings are cylindrically shaped so that they may be formed with boring tools.

What I claim as new is:—

In a reamer the combination of a carrier having a cutter holding slot therein, a cutter arranged in the slot, a groove in said cutter, a round pin operating against the cutter in said groove, a bushing operating against the pin and having one side cut away to provide a long contact therewith, and a screw reaching through said bushing into the carrier.

In testimony whereof I have hereunto set my hand.

FRANK P. MILLER.